Patented Aug. 29, 1939

2,170,855

UNITED STATES PATENT OFFICE 2,170,855

PRODUCTION OF ALKOXYACETONES

Henry C. Chitwood, Lakewood, Ohio, assignor to Carbide and Carbon Chemicals Corporation, a corporation of New York No Drawing. Application April 14, 1936,
Serial No. 74,288

20 Claims. (Cl. 260—594)

This invention relates to the production of alkoxyacetones; and more especially it involves their manufacture from the mono-alkyl ethers of 1,2 propylene glycol by removal therefrom of hydrogen by catalytic oxidation or dehydrogenation in the vapor phase. The mono-alkyl ethers of 1,2 propylene glycol, herein referred to as alkoxyisopropanols, have the general formula $CH_3CHOHCH_2OR$. In those compounds contemplated by the inventor R is an alkyl radical which may contain from one to five carbon atoms inclusive.

The alkoxyisopropanols utilized in the process may be prepared in various ways, as, for example, by reacting propylene oxide and an aliphatic alcohol such as methanol or ethanol in known manner. When prepared in this manner, small amounts of the isomeric alkoxy n-propanols may be present, which then may be separated from the alkoxyisopropanol by fractional distillation. The former constitute less than 5% of the total reaction product where methanol or ethanol is reacted with propylene oxide.

It is possible to use mixtures of these isomeric alcohols as starting materials in the oxidation or the dehydrogenation step, in which case small amounts of the alkoxy n-propanols are converted to the corresponding alkoxypropionaldehydes. These are present in the low-boiling fractions of the condensed reaction products resulting from the oxidation or dehydrogenation, and may be separated from the high-boiling fractions containing the major portion of the alkoxyacetones by fractional distillation.

The reactions involved in the oxidation or dehydrogenation step may be illustrated by the following equation:

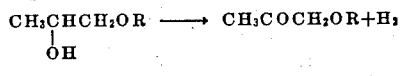

(Alkoxyisopropanol)      (Alkoxyacetone)

wherein R designates an alkyl radical which may contain from one to five carbon atoms inclusive.

Separation of the alkoxyacetones from the unreacted alkoxyisopropanols may be accomplished by fractional distillation of the reaction mixture, followed by careful refractionation of the fractions containing the alkoxyacetone. Thus, by such a refractionation of a fraction boiling within the range of from 130° to 134° C. at atmospheric pressure, and obtained from the reaction product resulting from the dehydrogenation of ethoxyisopropanol, a liquid containing about 80% of ethoxyacetone together with unreacted ethoxyisopropanol was obtained. By treating such a mixture with an organic acid or anhydride, it has been found possible to convert the unreacted alkoxyisopropanol into an ester having a different boiling point than that of the said alkoxyisopropanol. Practically pure alkoxyacetone then can be secured by fractional distillation of this reaction mixture. Operating in this manner with butyric anhydride, alkoxyacetones having a purity of 99% have been secured.

According to one modification of the invention, a mixture of the vapors of an alkoxyisopropanol with air, oxygen, or other oxidizing gas is conducted over an oxidation catalyst in a reaction zone maintained at a temperature within the range of from around 250° C. to around 300° C. The reaction mixture containing the resultant alkoxyacetone and unreacted alkoxyisopropanol is condensed. The condensate then is fractionally distilled, preferably under atmospheric or sub-atmospheric pressure, and the alkoxyacetone then is separated from any unreacted starting material and by-products in manner hereinbefore described.

As catalysts for the oxidation there may be employed a number of well known metallic oxide catalysts, such as silver oxide, and the oxides of copper, nickel and cobalt; or metal catalysts such as copper, copper-chromium alloys, chromium, silver, cobalt, and nickel. The catalyst preferably is supported upon a porous inert carrier, such as silica gel, finely-divided aluminum or aluminum pellets, alumina, and unglazed earthenware.

According to another modification of the invention, the conversion of the alkoxyisopropanol to the corresponding alkoxyacetone is effected in the absence of an oxidizing agent. The vapors of the alkoxyisopropanol are conducted, preferably at around atmospheric pressure, over a dehydrogenation catalyst, in a reaction zone maintained at a temperature within the range of from around 275° C. to around 300° C. The vaporous reaction mixture containing the alkoxyacetone and unreacted alkoxyisopropanol is condensed. The condensate then is fractionally distilled under a pressure around atmospheric or below, and the ketone thereafter is separated from any unreacted starting material and by-products, in the manner hereinbefore described. The dehydrogenation effectively is catalyzed by metal catalysts, preferably those consisting of reduced copper, either alone or supported upon a porous inert carrier, such as those already mentioned. Exceptionally high efficiencies, in terms of alkoxyacetones produced, are obtainable by the use of catalysts containing, in addition to reduced metallic copper, small amounts of chromium, which catalysts preferably are supported upon inert carriers. It is probable that the chromium is not reduced, but is present as an oxide, $Cr_2O_3$.

The following examples serve to illustrate the invention, the scope of which is in no sense intended to be limited thereby.

Example 1

A vaporous mixture consisting of 455 grams of ethoxyisopropanol and 42.4 liters of air was preheated and passed during a period of 5.6 hours into contact with 200 cc. of a silver oxide catalyst within a reaction zone maintained at 260° C. The vaporous reaction products were condensed by a water-cooled condenser. The uncondensed or blow-off gases contained 97% nitrogen, 0.1% ethylene, 2.0% carbon dioxide, 0.8% carbon monoxide, and 0.0% oxygen.

The condensate was fractionally distilled, and the following fractions were secured:

| Fraction No. | Boiling range | Approx. wt. contained ethoxyacetone |
|---|---|---|
| | °C. | Grams |
| 1 | Up to 110 | 2.43 |
| 2 | 110–125 | 4.85 |
| 3 | 125–130 | 28.55 |
| 4 | 130–134 | 4.42 |
| Residue | | 3.39 |

Fractions 1 and 2 contained some ethoxypropionaldehyde. The ethoxyacetone was produced in this example with an overall yield of 9.8%, and an efficiency of 70.8%.

The catalyst used in this example was prepared by evaporating to dryness an aqueous suspension of 75 grams of silver oxide with 200 cc. of aluminum pellets which had been etched previously by a two-hour treatment with dilute hydrochloric acid. The catalyst was held in an electrically-heated aluminum tube of 1.5 inch bore through which the mixture of reactants was passed.

Example 2

The vapors of 908 grams of ethoxyisopropanol were passed in four hours over 1400 cc. of a reduced copper-chromium catalyst supported on "Filtros" and disposed in a converter of 2-inch diameter iron pipe four feet in length, maintained at an average temperature of 280° C. The vaporous reaction products were passed through a water-cooled condenser, and 903 grams of condensate obtained, together with 81 liters of a gas containing 94.9% of hydrogen, 2.7% of carbon monoxide, 1.2% of carbon dioxide, 1.0% of olefines, and 0.2% of nitrogen.

The condensate was fractionally distilled; and the fractions containing the ketone are designated below:

| Fraction number | Weight | Boiling range | Approx. wt. contained ethoxyacetone |
|---|---|---|---|
| | Grams | °C. | Grams |
| 1 | 47 | 68–122 | 25.19 |
| 2 | 453 | 122–133 | 216.1 |
| 3 | 251 | 133–137 | 55.22 |
| 4 | 106 | 137–140 | 4.35 |

Fraction 1 contained some ethoxypropionaldehyde due to the presence of a small amount of ethoxy n-propanol in the starting material. The overall yield of ethoxyacetone was 33.7%; with an efficiency in terms of ethoxyacetone of 87.2%.

The catalyst used in this example may be prepared by immersing chips of porous, artificial filter stone (composed principally of silica, and sized between ⅛ and 1/16 inch mesh screens) in an aqueous solution containing 24% of cupric nitrate and about 0.5% of chromic nitrate. The impregnated chips then are dried and roasted in a current of air of 500° C. until evolution of oxides of nitrogen ceases. This mass then is reduced with a stream of hydrogen in the catalyst tube at a temperature of 275° C.

Example 3

Using the apparatus and catalyst described in Example 2, 925 grams of methoxyisopropanol vapors were passed over 1400 cc. of the catalyst in 6.67 hours, in a reaction zone maintained at 275° C. The vaporous reaction products were passed through a water-cooled condenser, and 908 grams of a liquid condensate were obtained, together with non-condensable gases containing around 97% of hydrogen.

The condensate was fractionally distilled at atmospheric pressure, with the following results:

| Fraction number | Weight | Boiling range | Approx. Wt. contained methoxyacetone |
|---|---|---|---|
| | Grams | °C. | Grams |
| 1 | 40 | Up to 100 | 6.4 |
| 2 | 44 | 100–112 | 12.54 |
| 3 | 511 | 112–122 | 270.83 |
| 4 | 114 | 122–127 | 1.14 |
| 5 | 143 | 127–129 | nil |

In this example, the methoxyacetone was produced with an overall yield of 32.0%, and an efficiency of 91.7%.

Fractions 1 and 2 contain small amounts of methoxypropionaldehyde. The higher fractions are free of this compound, but contain unreacted methoxyisopropanol which may be removed and the methoxyacetone isolated by converting the methoxyisopropanol into the corresponding butyric ester according to the following procedure.

The separation of alkoxyacetones from alkoxyisopropanols may be illustrated by the following example involving the separation of methoxyacetone from methoxyisopropanol:

Two hundred grams of a mixture containing 140 grams of methoxyacetone and 60 grams of methoxyisopropanol in a closed reaction vessel had 3 drops of concentrated sulfuric acid added thereto. This mixture was heated to the boiling point and 111 grams of butyric anhydride were added over a period of 25 minutes. One gram of potassium carbonate was then added, and the mixture was distilled at atmospheric pressure. One hundred twenty-seven grams of liquid distillate boiling from 108 to 126° C. were collected. The residue, consisting chiefly of the butyl ester of methoxyisopropanol and butyric acid, was not distilled. The distillate was washed with saturated potassium carbonate and redistilled with the following results:

| Fraction number | Weight | Boiling point | Methoxyacetone |
|---|---|---|---|
| | Grams | °C. | Percent |
| 1 | 15 | 89–112 | |
| 2 | 22 | 112–113 | 94.1 |
| 3 | 56 | 113–113.2 | 99.0 |
| Residue | 19 | | |

By substituting for the methyl or ethyl ethers of 1,2 propylene glycol, i. e.,—methoxyisopropanol or ethoxyisopropanol,—the corresponding n-propyl, isopropyl, n-butyl, isobutyl, tertiary butyl, amyl, and isoamyl ethers thereof, the corresponding alkoxyacetones may be produced.

The alkoxyacetones prepared in accordance with the invention have a wide field of utility, being of general use as lacquer solvents; and they are particularly effective solvents for vinyl resins. They are miscible with the usual organic solvents. Methoxy- and ethoxyacetone are miscible with water. Apparently, however, the solubility of the alkoxyacetones in water decreases rather rapidly with increasing molecular weight.

By the practice of the present invention it has become possible for the first time to prepare these valuable organic solvents from alkoxyisopropanols which in turn are preparable from relatively inexpensive, commercially available starting materials, i. e. propylene oxide and one of the lower aliphatic alcohols. Hydrogen of a purity of 95–97% concurrently is evolved, and is readily recovered in form suitable for many uses.

The expression "overall yield" as used herein designates the percentage of the total alkoxyisopropanol charged which is converted to alkoxyacetone; and the expression "efficiency" designates the percentage of the total alkoxyisopropanol reacted which is converted to alkoxyacetone.

The term "dehydrogenation catalyst" and similar terms appearing in the specification and claims are intended to designate those catalysts of the type hereinbefore described which function to dehydrogenate or remove hydrogen from an alkoxyisopropanol maintained in the vapor state at an elevated temperature,—with the production of an alkoxyacetone.

The invention is susceptible of modification within the scope of the appended claims.

I claim:

1. The process which comprises passing the vapors of an alkoxyisopropanol into contact, in a highly heated reaction zone, with a dehydrogenation catalyst thereby removing hydrogen from the alkoxyisopropanol, and recovering the alkoxyacetone thus produced.

2. Process as defined in claim 1, according to which the said vapors are contacted with the catalyst in the presence of an oxygen-containing gas.

3. The process which comprises passing the vapors of an alkoxyisopropanol into contact, in a highly heated reaction zone, with a dehydrogenation catalyst thereby removing hydrogen from the alkoxyisopropanol, condensing the resultant reaction mixture containing alkoxyacetone and unreacted alkoxyisopropanol, reacting the said mixture with a compound selected from the group consisting of organic acids and organic acid anhydrides, fractionally distilling the resultant reaction mixture, and separately condensing and recovering the fraction containing the alkoxyacetone.

4. Process for the production of an alkoxyacetone, which comprises removing hydrogen from an alkoxyisopropanol maintained in the vapor state at an elevated temperature in the presence of a solid dehydrogenation catalyst, condensing the reaction products, and recovering from the resultant condensate the alkoxyacetone present therein.

5. Process which comprises passing the vapors of an alkoxyisopropanol into contact, in a heated reaction zone, with a catalyst selected from the group consisting of the oxides of silver, copper, nickel, and cobalt; metallic copper, copper-chromium alloys; chromium, silver, nickel and cobalt, thereby removing hydrogen from the said alkoxyisopropanol, and condensing and recovering the resultant reaction products.

6. Process as defined in claim 5, in which the said vapors are contacted with the catalyst in the presence of an oxidizing gas.

7. Process for the catalytic oxidation of an alkoxyisopropanol to the corresponding alkoxyacetone, which comprises reacting the former in the vapor phase with an oxygen-containing gas in the presence of an oxidation catalyst.

8. Process for the catalytic oxidation of an alkoxyisopropanol to the corresponding alkoxyacetone, which comprises reacting the former in the vapor phase with an oxygen-containing gas in the presence of a silver oxide catalyst.

9. Process for the production of an alkoxyacetone, which comprises reacting in the vapor phase an alkoxyisopropanol with an oxygen-containing gas at an elevated temperature in the presence of a catalyst selected from the group consisting of the oxides of silver, copper, nickel, and cobalt; metallic copper, copper-chromium alloys; chromium, silver, nickel and cobalt, thereby removing hydrogen from the said alkoxyisopropanol, condensing the reaction products at around normal room temperature, fractionally distilling the condensate, and recovering the alkoxyacetone present therein.

10. Process which comprises passing a mixture of the vapors of an alkoxyisopropanol and an oxygen-containing gas into contact with a solid oxidation catalyst maintained within a highly heated reaction zone, and recovering the alkoxyacetone thus produced.

11. Process as defined in claim 10, wherein the reaction zone is maintained at a temperature within the range of from around 250° C. to around 300° C.

12. Process which comprises passing the vapors of an alkoxyisopropanol into contact with a dehydrogenation catalyst in a highy heated reaction zone maintained at a temperature within the range of from about 250° C. to about 300° C.

13. Process which comprises passing the vapors of an alkoxyisopropanol into contact with a dehydrogenation catalyst supported on an inert porous carrier, in a highly heated reaction zone maintained at a temperature within the range of from about 250° C. to about 300° C.

14. Process which comprises passing the vapors of an alkoxyisopropanol into contact with a reduced copper catalyst in a highly heated reaction zone maintained at a temperature within the range of from about 250° C. to about 300° C.

15. Process which comprises passing the vapors of an alkoxyisopropanol into contact with a reduced copper catalyst containing a small amount of chromium in the form of oxide, in a highly heated reaction zone maintained at a temperature within the range of from about 250° C. to about 300° C.

16. The process of making an alkoxyacetone, which comprises passing vapors of an alkoxyisopropanol into contact, in a highly heated reaction zone, with a dehydrogenation catalyst essentially containing reduced copper, cooling and condensing the reaction products, and separating from the resultant condensate the alkoxyacetone present therein.

17. The process of making methoxyacetone, which comprises passing vapors of methoxyisopropanol into contact, in a highly heated reaction zone, with a dehydrogenation catalyst, thereby removing hydrogen from the methoxyisopropanol, cooling and condensing the reaction products, and separating from the resultant condensate the methoxyacetone present therein.

18. The process of making ethoxyacetone, which comprises passing the vapors of ethoxyisopropanol into contact, in a highly heated reaction zone, with a dehydrogenation catalyst, thereby removing hydrogen from the ethoxyisopropanol, cooling and condensing the reaction products, and separating from the resultant condensate the ethoxyacetone present therein.

19. Process which comprises dehydrogenating an alkoxyisopropanol in the vapor phase in the presence of a solid dehydrogenation catalyst, and separately recovering the alkoxyacetone thus produced.

20. Process which comprises passing the vapors of an alkoxyisopropanol into contact in a heated reaction zone with a metal catalyst functioning at the temperature maintained in said zone to remove hydrogen from the alkoxyisopropanol, withdrawing the resultant reaction products, and condensing and separately recovering the alkoxyacetone present therein.

HENRY C. CHITWOOD.